US012773878B2

(12) United States Patent
Leschyshyn

(10) Patent No.: US 12,773,878 B2
(45) Date of Patent: Oct. 27, 2026

(54) TIRE FOR USE ON A SPORTING OFF ROAD VEHICLE FOR TRAVEL IN WATER AND MUD

(71) Applicant: Benjamin Leschyshyn, Redwood Meadows (CA)

(72) Inventor: Benjamin Leschyshyn, Redwood Meadows (CA)

( * ) Notice: Subject to any disclaimer, the term of this patent is extended or adjusted under 35 U.S.C. 154(b) by 0 days.

(21) Appl. No.: 19/093,480

(22) Filed: Mar. 28, 2025

(65) Prior Publication Data

US 2026/0296110 A1 Oct. 1, 2026

(51) Int. Cl.
*B60C 11/11* (2006.01)
*B60C 11/03* (2006.01)

(52) U.S. Cl.
CPC ....... *B60C 11/0311* (2013.01); *B60C 11/0302* (2013.01); *B60C 2011/0313* (2013.01); *B60C 2200/14* (2013.01)

(58) Field of Classification Search
CPC ......... B60C 11/0311; B60C 2011/0313; B60C 11/0302
See application file for complete search history.

(56) References Cited

U.S. PATENT DOCUMENTS 3,547,175 A * 12/1970 Verdier ............... B60C 11/0311 152/209.12
5,010,935 A * 4/1991 Bonko ................ B60C 11/0316 152/209.12
5,375,640 A * 12/1994 Harms ................ B60C 11/0316 152/209.15
6,021,829 A * 2/2000 Rooney ............... B60C 11/0311 152/209.12

FOREIGN PATENT DOCUMENTS

DE 29521289 U1 * 1/1997
GB 1588644 A * 4/1981 ............. B60C 11/01

OTHER PUBLICATIONS

English machine translation of DE29521289 (Year: 1997).*

* cited by examiner

*Primary Examiner* — Robert C Dye
(74) *Attorney, Agent, or Firm* — Adrian D. Battison; Ryan W. Dupuis; Ade & Company Inc.

(57) ABSTRACT

In a tire designed primarily for use in water and mud the tire body is includes a series of left and right pairs of lugs where each lug has a first portion on the center line, a second portion on the peripheral wall extending from the center line to the side edge and a third portion extending along the side wall toward the bead. The second portion is shaped such that the leading face thereof is inclined from the center line in a direction toward the side edge and rearwardly, and then curves toward the side edge and forwardly to form a forwardly facing scoop portion to engage and retain the material. The second portion connects to the third portion so that the leading face of the second portion merges into the leading face of the third portion and such that the leading face of the third portion faces forwardly to engage the material at the side wall.

10 Claims, 4 Drawing Sheets

TIRE FOR USE ON A SPORTING OFF ROAD VEHICLE FOR TRAVEL IN WATER AND MUD

The invention relates to a tire for use on a sporting off road vehicle for travel in material containing water and mud. Such tires typically include an annular tire body having a peripheral wall having a center line and extending therefrom to a side edge of the peripheral wall which connects to respective side walls each extending from the outer edge of the peripheral wall inwardly toward a respective tire bead by which the tire is mounted on a wheel rim for inflation of the annular tire body together with a plurality of tire lugs connected to the tire body and extending outwardly therefrom for engaging the material as the tire rotates on the wheel rim where the tire lugs being arranged at angularly spaced position around the tire body and include left and right pairs of lugs arranged alternately around the tire body. Such a tire defines a direction of rotation so that each lug has a leading face facing forwardly of the direction of rotation for engaging the material and a trailing face facing rearwardly of the direction of rotation.

SUMMARY OF THE INVENTION

According to the invention each lug has a first portion on the center line, a second portion on the peripheral wall and a third portion extending along the side wall toward the bead;

- the second portion extending from the center line to the side edge of the peripheral wall;
- the second portion being shaped such that the leading face thereof is inclined from the center line in a direction toward the side edge and rearwardly, and then curves toward the side edge and forwardly to form a forwardly facing scoop portion to engage and retain the material;
- the second portion connecting to the third portion so that the leading face of the second portion merges into the leading face of the third portion and such that the leading face of the third portion faces forwardly to engage the material at the side wall.

Preferably the leading face of the scoop forms a smooth concave curve.

Preferably the leading face of the scoop is shaped so as to collect material moving from the center line toward the side wall and collect material moving from the third portion toward the center line.

Preferably an end of the second portion at the side wall is angularly retarded relative to an end of the second portion at the center line. Preferably the scoop of the second portion starts at a position of the order of half way along the second portion and terminates adjacent the side edge of the peripheral wall. Thus the scoop collects primarily material moving toward the side wall but also collects some material at the side wall and moves both into the scoop Preferably the third portion extends from an end of the third portion at the side wall so as to be inclined rearwardly and toward the bead. The third portion is arranged to move the material rearwardly as the tire rotates, as the vehicle needs to move forwardly. That is, as the tire spins the third portion pulls the material from the front of the tire to the rear of the tire where the material exits. This is why the side lug is angled rearwardly and toward the bead so the water and mud can exit at the rear. However the third portion may be radial to the axis of the wheel.

Preferably the third portion on the side wall creates centrifugal force which in turn gives the design of this tread pattern a greater level of performance.

Preferably the system operates because the third portion is shaped so as to force the material away from the tire body which motivates the vehicle to move away from the material and forward because of the force created by the third portion and the scoop of the second portion.

Preferably the term scoop as used herein defines any arc end that is equal to or greater than the start. Scoop can be defined as smooth or having breaks in a concave contour, no matter how it is formed.

Preferably the system operates because the third portion catches any material that makes it past the scoop to move that material rearwardly and to add to the performance level of this design.

Preferably the system operates because the second portion is shaped so that when the material gets caught in the scoop it creates a trap for the material so that the force created in the scoop will propel the vehicle forward in all types of material at speeds far greater than any other lug bar design available in the market.

Preferably the system operates because any material that gets past the outside edge of the scoop at the end of the second portion is caught by the third portion.

Preferably the leading face of the second portion is contiguous with the leading face of the third portion Preferably the second portion extends to a position beyond the side wall and more preferably to a distance equal to a height of the third portion from the side wall.

Preferably the lug has an outer face substantially at right angles to the leading and trailing faces. This provides the second portion which has the outer face thereof which joins to the outer face of the third portion at a right angle and the outer face of the third portion is substantially parallel to the side wall.

Preferably at least the second and third portions of the lug have a slot therein from the outer face extending toward the tire body.

As the lugs are intended for sports off road tires, the second portion has a height from the peripheral wall in the range 1 to 8 inches depending on the tire diameter to provide the necessary aggressive action.

Preferably the second and third portions of the lug have a substantially constant width between the leading and trailing faces. This can lie in the range 0.8 to 2.4 inches.

Preferably the first portion extends along the center line so as to define side faces each on a respective side of the center line and the first portion extends along the center line to a length such that a front edge of the first portion is spaced from a rear edge of a next adjacent first portion.

The arrangement set forth above operates effectively because it provides the following features:

The angled lug bar cuts the material sending it to the outer edge of the tire.

As it travels down the lug bar it gets caught in the lug scoop at the end of the lug bar.

When the material gets caught in the lug bar scoop it creates a trap for debris, this force created in the scoop will propel the vehicle forward in all types of material at speeds far greater than any other lug bar design available in the market.

The little debris that gets past the outside edge of the scoop at the end of the lug bar is caught by the side lug.

The side lug creates two types of protection for success in the mechanics of this design. Firstly, it will catch any material that makes it past the scoop to add to the performance level of this design.

Secondly the material that is met at the sidewall of the tire creates centrifugal force by the side lug which in turn gives the design of this tread pattern a greater level of performance.

This technique forces debris away from the tire which motivates the vehicle to move away from the material. The direction it will move is forward because of the force created by the lug bar and lug bar scoop design.

Each component of this tread pattern works in a synergistic way to create the ultimate mobile force far greater than any other tread pattern.

The water/mud will travel the length of the lug bar to be caught near the end of the scoop to propel the vehicle forward in a more rapid manner.

The lugs at the side will act as a further barrier to stop the water/mud that the scoop has caught from getting behind the lug bar/side lug therefore giving added propulsion in water/mud.

The center block and the outer scoop edge will act as a trap not allowing water and/or other loose materials to get behind each lug bar or side lug.

DETAILED DESCRIPTION

Figure 1:
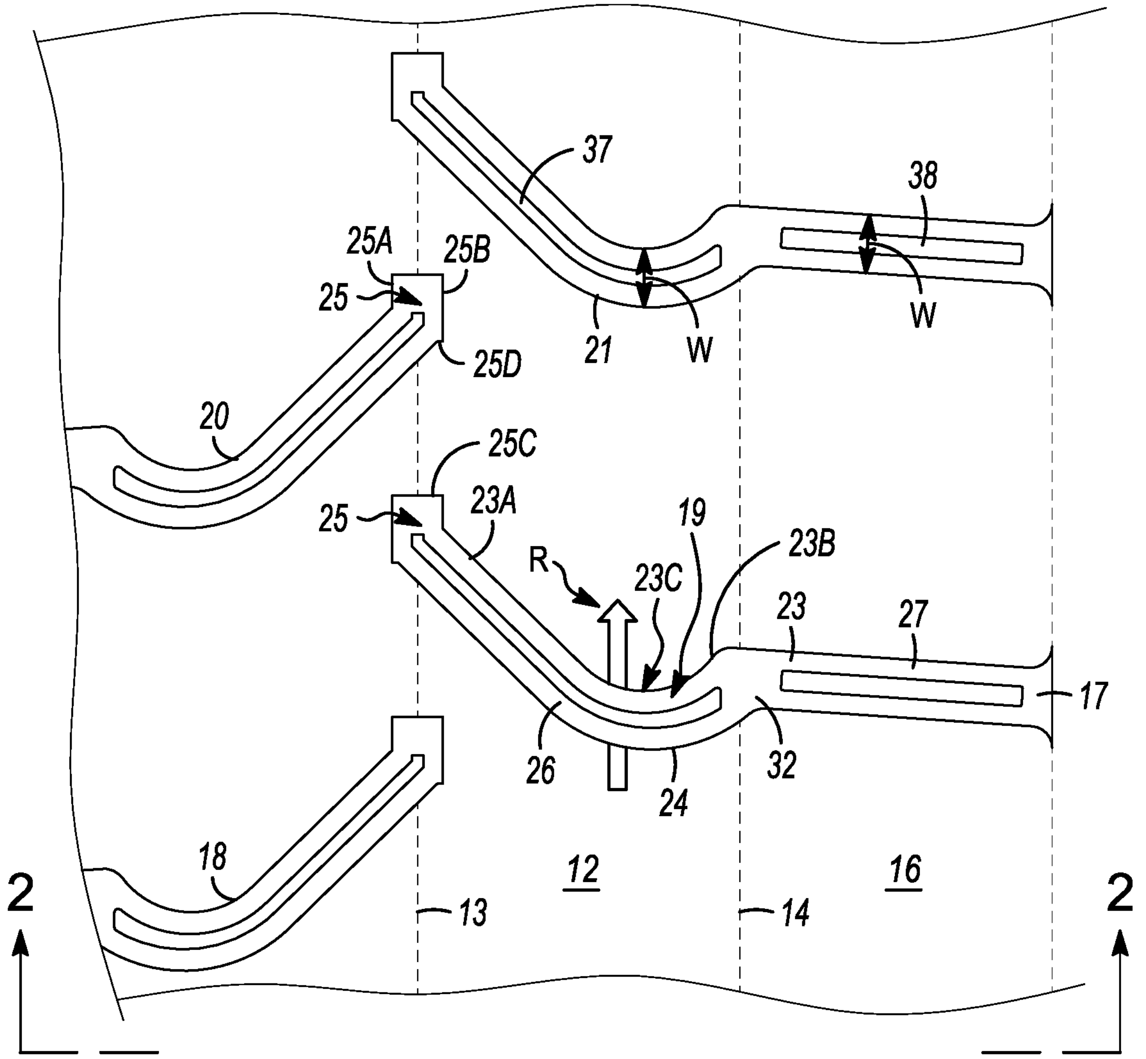
FIG. 1 is a schematic illustration of the peripheral wall and one side wall of a tire body showing the shape of lugs applied thereto. The view shows the tire body laid flat so that the peripheral wall is in the same plane as the side walls so as to better show the shape of the lugs.

The tire 10 shown includes an annular tire body 11 with a peripheral wall 12 defining a center line 13 and extending therefrom to a side edge 14 of the peripheral wall which connects to respective side walls 15, 16 each extending from the respective side edge 14 of the peripheral wall radially inwardly toward a respective tire bead 17 by which the tire 10 is mounted on a wheel rim (not shown) for inflation of the annular tire body.

The tire body 11 carries a plurality of tire lugs 18, 19, 20, 21 etc connected to the tire body by molding of the material of the lugs onto the carcass defined by the body in conventional manner. The lugs extend outwardly from the axis of the tire body for engaging the material as the tire rotates on the wheel rim.

The tire lugs 18, 19, 20, 21 etc are arranged at angularly spaced position around the tire body and in left and right pairs 18, 9 and 20, 21 arranged alternately around the tire body. The tire defines a direction of rotation R so that each lug has a leading face 23 facing forwardly of the direction of rotation for engaging the material and a trailing face 24 facing rearwardly of the direction of rotation.

Each lug has three individual portions including a first portion 25 on the center line 13, a second portion 26 on the peripheral wall 12 and a third portion 27 extending along the side wall 16 toward the bead 17.

Figure 3:
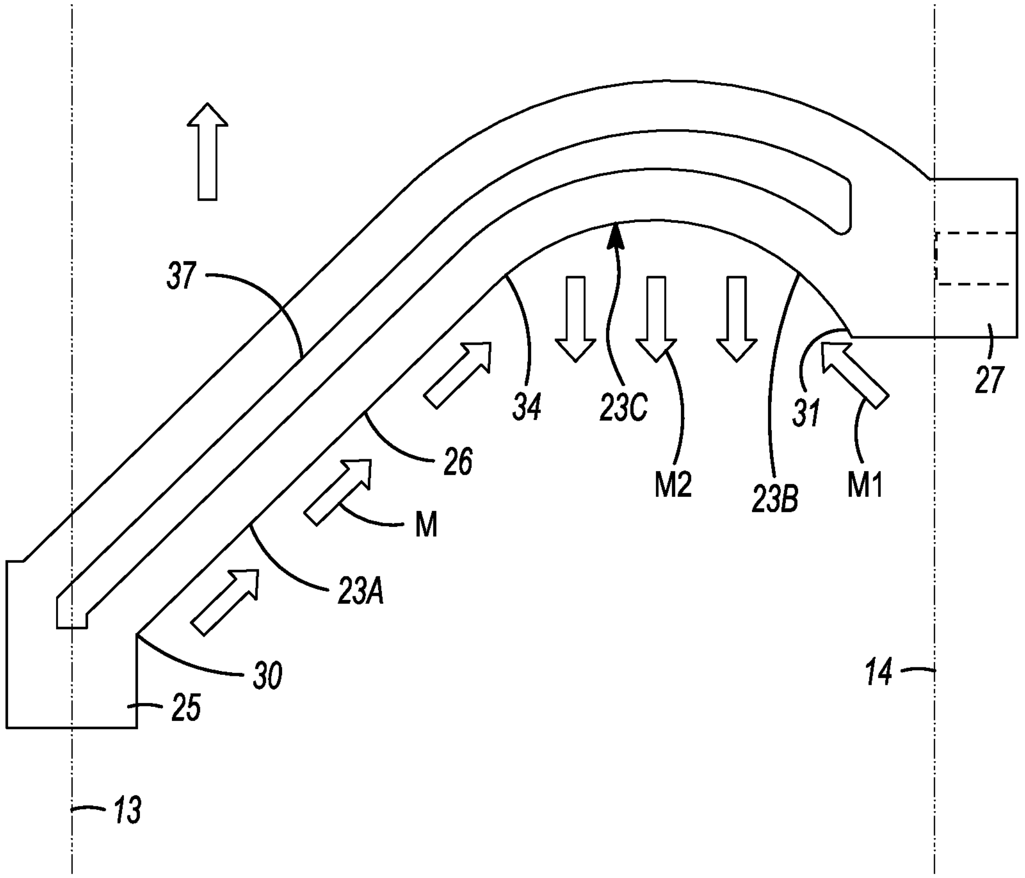
FIG. 3 is a plan view of one lug of FIG. 1 showing the movement of the material relative to the lug as it moves on the forward direction in the material.
Figure 4:
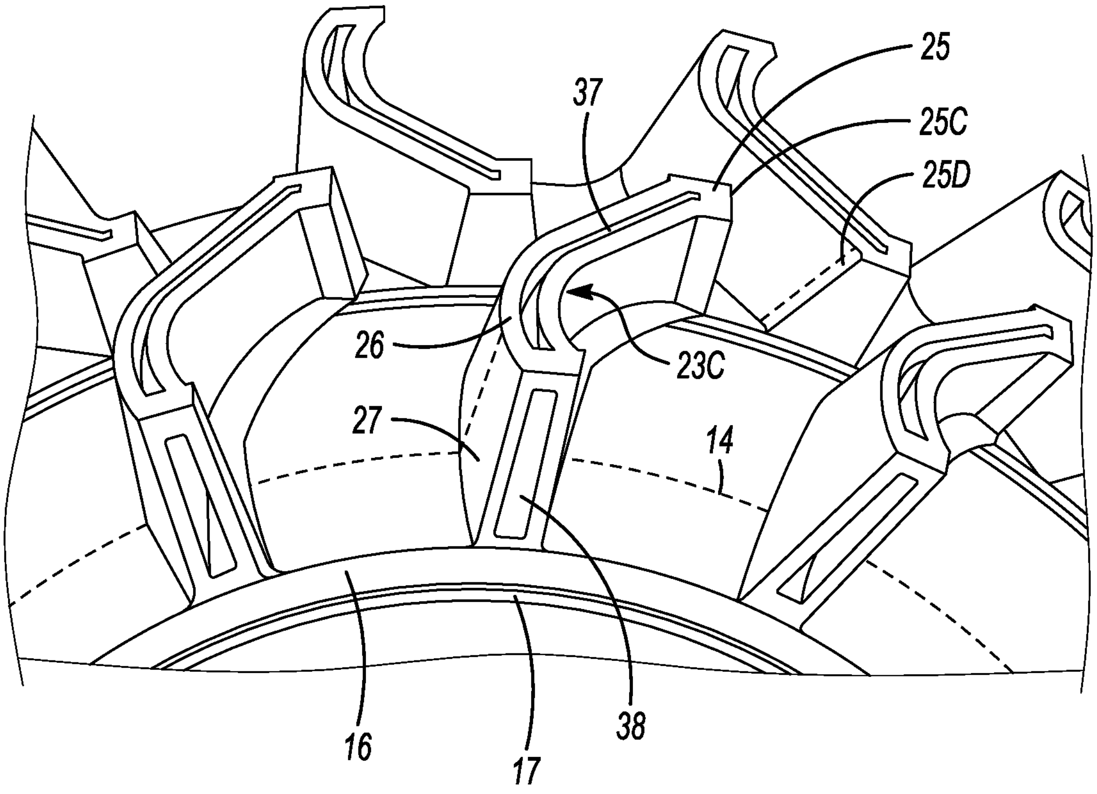
FIG. 4 is an isometric view along the lines 2-2 of FIG. 1 of one portion of the tire body from the top and one side showing some of the lugs.

The second portion 26 extends from the center line 13 to the side edge 14 of the peripheral wall 12 with the second portion 26 being shaped as shown in FIG. 3 such that the leading face 23 thereof is inclined at 23A from the center line in a direction toward the side edge 14 and rearwardly, and then curves toward the side edge 14 and forwardly in a portion 23B to form a forwardly facing scoop portion 23C to engage and retain the material. The second portion 26 connects to the third portion 27 so that the leading face 23 of the second portion 26 merges into the leading face 23 of the third portion 27 and such that the leading face 23 of the third portion 27 faces forwardly to engage the material at the side wall 16.

The leading face 23 of the scoop portion 23C forms a smooth concave curve and is shaped so as to collect at M2 material moving M from the center line 13 toward the side wall 14 and collect material M1 moving from the third portion 27 toward the center line 13. As shown at FIG. 3 an end 31 of the second portion at the side wall is angularly retarded relative to an end 30 of the second portion at the center line.

As shown in FIG. 1 the third portion 27 extends from an end 32 of the third portion at the side wall so as to be inclined rearwardly and toward the bead. In this way the third portion 27 creates centrifugal force which in turn gives the design of this tread pattern a greater level of performance. The third portion is shaped so as to force the material away from the tire which motivates the vehicle to move away from the material and forward because of the force created by the third portion 27 and the scoop 23C of the second portion.

The scoop 23C of the second portion 26 starts at a position 34 of the order of half way along the second portion 27 and terminates adjacent the side edge 14 of the peripheral wall.

Figure 2:
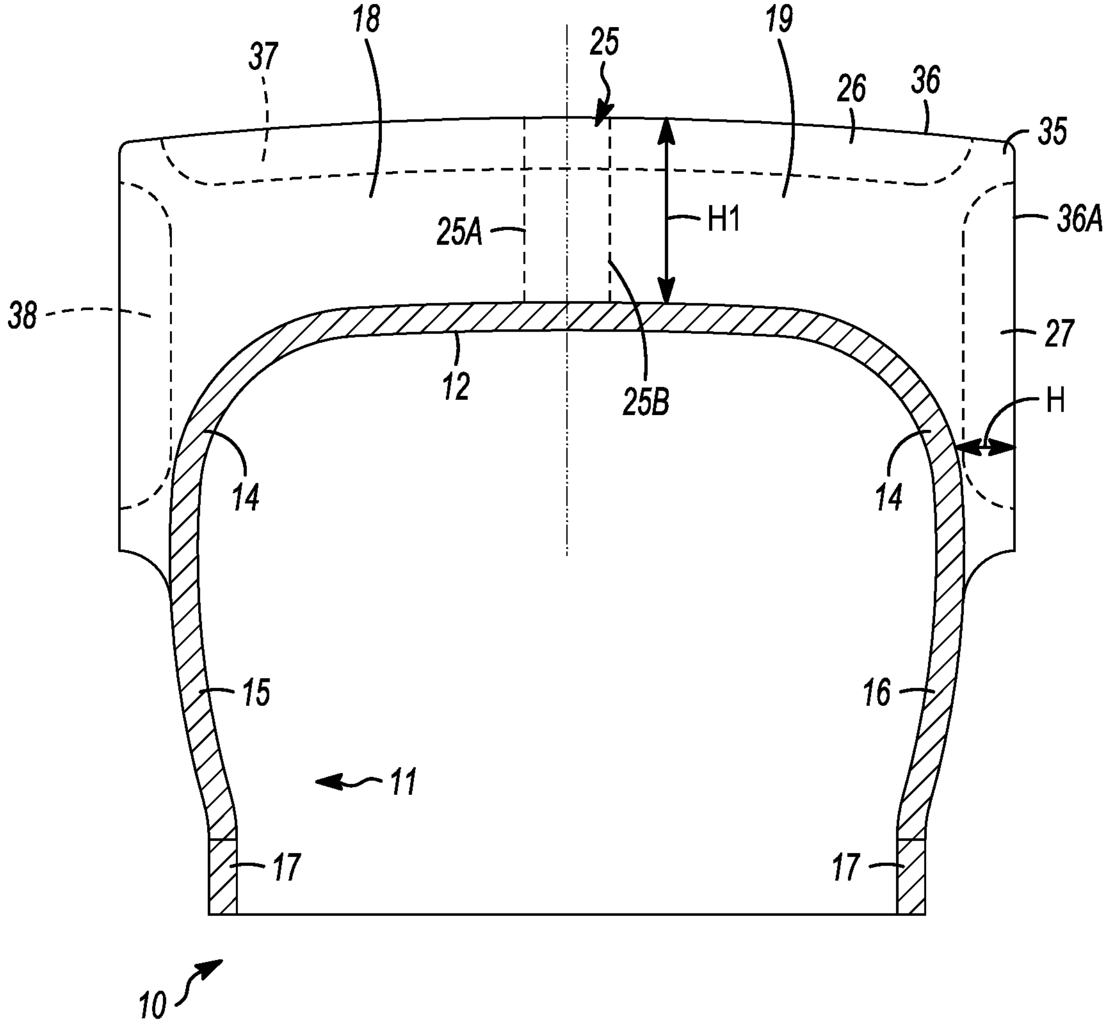
FIG. 2 is a cross-sectional view along the lines 2-2 of FIG. 1 but showing the tire body in its actual shape with the side walls generally at right angles to the peripheral wall.

The leading face 23 of the second portion 26 is contiguous with the leading face 23 of the third portion 27. As best shown in FIG. 2, the second portion 26 extends to a position 35 beyond the side wall 16 to a distance equal to a height H of the third portion 27 from the side wall 16. This forms an outer face 36 of the lug which lies substantially at right angles to the leading and trailing faces 23, 24. Thus the second portion 26 has the outer face 36 thereof which joins to the outer face 36A of the third portion 27 at a right angle at connection 35. As shown in FIG. 2 the outer face 36A of the third portion 27 is substantially parallel to the side wall 16 so that the height H of the lug at the portion 27 is substantially constant.

Both the second and third portions of the lug have a slot 37, 38 therein from the outer face extending toward the tire body.

The second 26 and third 27 portions of the lug have a substantially constant width W between the leading and trailing faces with the width between the leading and trailing faces of the order of 40 mm.

The first portion 25 extends along the center line so as to define side faces 25A and 25B each on a respective side of the center line 13. The first portion extends along the center line 13 to a length such that a front edge 25C of the first portion is spaced from a rear edge 25D of a next adjacent first portion.

The invention claimed is:

1. A tire for use on a sporting off road vehicle for travel in material containing water and mud, the tire comprising:

an annular tire body having a peripheral wall having a center line and extending therefrom to a side edge of the peripheral wall which connects to respective side walls each extending from the side edge of the peripheral wall inwardly toward a respective tire bead by which the tire is mounted on a wheel rim for inflation of the annular tire body;

a plurality of tire lugs connected to the tire body and extending outwardly therefrom for engaging the material as the tire rotates on the wheel rim;

the tire lugs being arranged at angularly spaced position around the tire body;

the tire lugs including left and right pairs of lugs arranged alternately around the tire body;

the tire defining a direction of rotation so that each lug has a leading face facing forwardly of the direction of rotation for engaging the material, an outer face and a trailing face facing rearwardly of the direction of rotation;

each lug having a first portion on the center line, a second portion on the peripheral wall and a third portion extending along the side wall toward the bead;

the second portion extending from the center line to the side edge of the peripheral wall and having a first end at the center line and a second end at the third portion;

the second portion being shaped such that the leading face thereof is inclined from the center line in a direction toward the side edge and rearwardly, and then curves toward the side edge and forwardly to form a forwardly facing smoothly curved U-shaped scoop portion to engage and retain the material;

the second portion connecting to the third portion at the second end of the second portion so that the leading face of the second portion merges into the leading face of the third portion and such that the leading face of the third portion faces forwardly to engage the material at the side wall;

wherein second end of the second portion and the third portion both project outwardly beyond the side wall; and wherein the third portion is inclined such that a first end of the leading face of the third portion at the second end of the second portion is angularly advanced in the direction of rotation relative to a second end of the leading face of the third portion at the side wall.

2. The tire according to claim 1 wherein the leading face of the second end of the second portion at the side wall is angularly retarded in the direction of rotation relative to the leading face at the first end of the second portion at the center line.

3. The tire according to claim 1 wherein the third portion is shaped so as to force the material away from the tire which motivates the vehicle to move away from the material and forward because of the force created by the third portion and the scoop of the second portion.

4. The tire according to claim 1 wherein the leading face of the second portion is contiguous with the leading face of the third portion.

5. The tire according to claim 1 wherein the second portion extends to a position beyond the side wall to a distance equal to a height of the third portion from the side wall.

6. The tire according to claim 1 wherein the outer face is substantially at right angles to the leading and trailing faces.

7. The tire according to claim 1 wherein the second portion has the outer face thereof which joins to the outer face of the third portion at a right angle.

8. The tire according to claim 1 wherein the outer face of the third portion is substantially parallel to the side wall.

9. The tire according to claim 1 wherein at least the second and third portions of the lug have a slot therein from the outer face extending toward the tire body.

10. The tire according to claim 1 wherein the second and third portions of the lug have a substantially constant width between the leading and trailing faces, wherein the first portion extends along the center line so as to define side faces each on a respective side of the center line and wherein the first portion extends along the center line to a length such that a front edge of the first portion is spaced from a rear edge of a next adjacent first portion.

* * * * *